United States Patent
Bouvier et al.

(10) Patent No.: US 6,814,114 B2
(45) Date of Patent: Nov. 9, 2004

(54) TIRE TO RIM ROTATION LIMITER FOR A RUN-FLAT ASSEMBLY

(75) Inventors: Jean-Luc Bouvier, Greer, SC (US); Jean-Claude Faure, Mozac (FR); Claude Eynard, Chanat-la-Mouteyre (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/994,385

(22) Filed: Nov. 26, 2001

(65) Prior Publication Data

US 2003/0098109 A1 May 29, 2003

(51) Int. Cl.⁷ .......................... B60B 21/02; B60B 21/10; B60C 15/02; B60C 17/00; B60C 17/04
(52) U.S. Cl. ........................ 152/158; 152/516; 152/520; 152/544; 152/379.3; 152/379.5; 152/384
(58) Field of Search ................................ 152/384, 513, 152/158, 520, 379.3, 379.4, 379.5, 381.4, 378 R, 375, 516, 544

(56) References Cited

U.S. PATENT DOCUMENTS

| | | | | |
|---|---|---|---|---|
| 1,295,266 A | * | 2/1919 | Bullard | 152/384 X |
| 1,340,094 A | * | 5/1920 | White | 152/384 X |
| 1,396,515 A | * | 11/1921 | McClevey | 152/384 |
| 1,566,028 A | * | 12/1925 | Macklin | 152/384 |
| 2,427,216 A | * | 9/1947 | Kraft | 152/384 |
| 2,620,010 A | * | 12/1952 | Buckwalter | 152/384 |
| 3,784,260 A | * | 1/1974 | Araya | 152/379.3 X |
| 4,015,652 A | | 4/1977 | Harris | |
| 4,148,348 A | * | 4/1979 | French et al. | 152/379.3 |
| 4,241,775 A | | 12/1980 | Jackson | |
| 4,269,251 A | * | 5/1981 | Harrington et al. | 152/379.5 X |
| 4,305,444 A | * | 12/1981 | Suris | 152/158 |
| 4,325,422 A | | 4/1982 | Corner et al. | |
| 4,823,854 A | | 4/1989 | Payne et al. | |
| 4,922,981 A | | 5/1990 | Pompier | |
| 5,435,363 A | | 7/1995 | Pender | |
| 5,634,993 A | | 6/1997 | Drieux et al. | |
| 5,749,982 A | | 5/1998 | Muhlhoff et al. | |
| 5,787,950 A | | 8/1998 | Muhlhoff et al. | |
| 5,868,190 A | | 2/1999 | Willard, Jr. et al. | |
| 5,885,383 A | * | 3/1999 | French | 152/158 |
| 5,891,279 A | | 4/1999 | Lacour | |

FOREIGN PATENT DOCUMENTS

| | | | | |
|---|---|---|---|---|
| DD | L 20502 II/63d | * | 6/1956 | 152/384 |
| GB | 283660 | * | 1/1928 | 152/384 |
| JP | 62163802 A | * | 7/1987 | 152/379.5 |
| JP | 62275802 A | * | 11/1987 | 152/381.4 |
| JP | 05169901 A | * | 7/1993 | 152/384 |
| JP | 06135202 | * | 5/1994 | 152/384 |
| JP | 06211001 A | * | 8/1994 | 152/384 |
| WO | WO-01/25030 A1 | * | 4/2001 | 152/384 |

* cited by examiner

*Primary Examiner*—Adrienne C. Johnstone
(74) *Attorney, Agent, or Firm*—Dority & Manning, P.A.

(57) ABSTRACT

A tire apparatus for driving a vehicle allows the vehicle to be driven during periods of both low tire pressure and normal tire pressure. The tire apparatus has a tire that has a tread section. The tire has a pair of side walls that are located adjacent to the tread section. A first bead is located at an end of one of the side walls, and a second bead is located at an end of the other side wall. A wheel is also present that has a rim with a first bead seat and a second bead seat. The wheel is configured for attachment to the vehicle. The wheel has a support member for engaging the tire during periods of low tire pressure. At least one of the first and second bead seats has a plurality of friction members to prevent relative rotational movement between the tire and the rim.

10 Claims, 8 Drawing Sheets

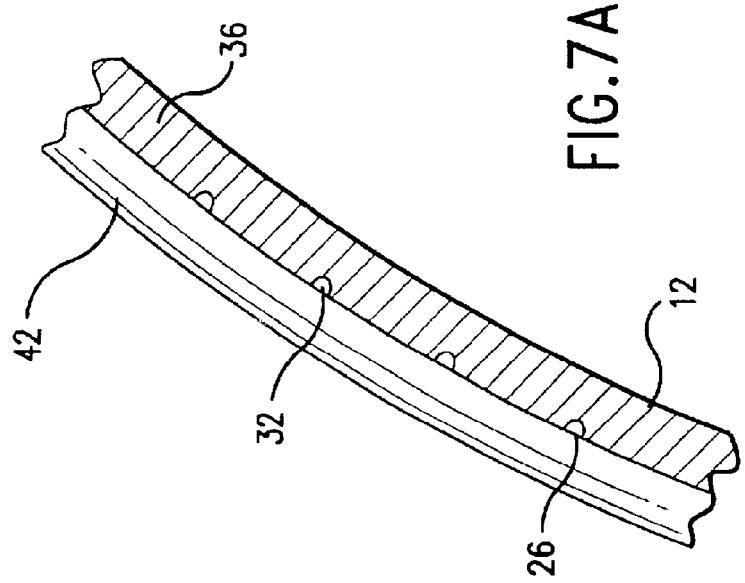
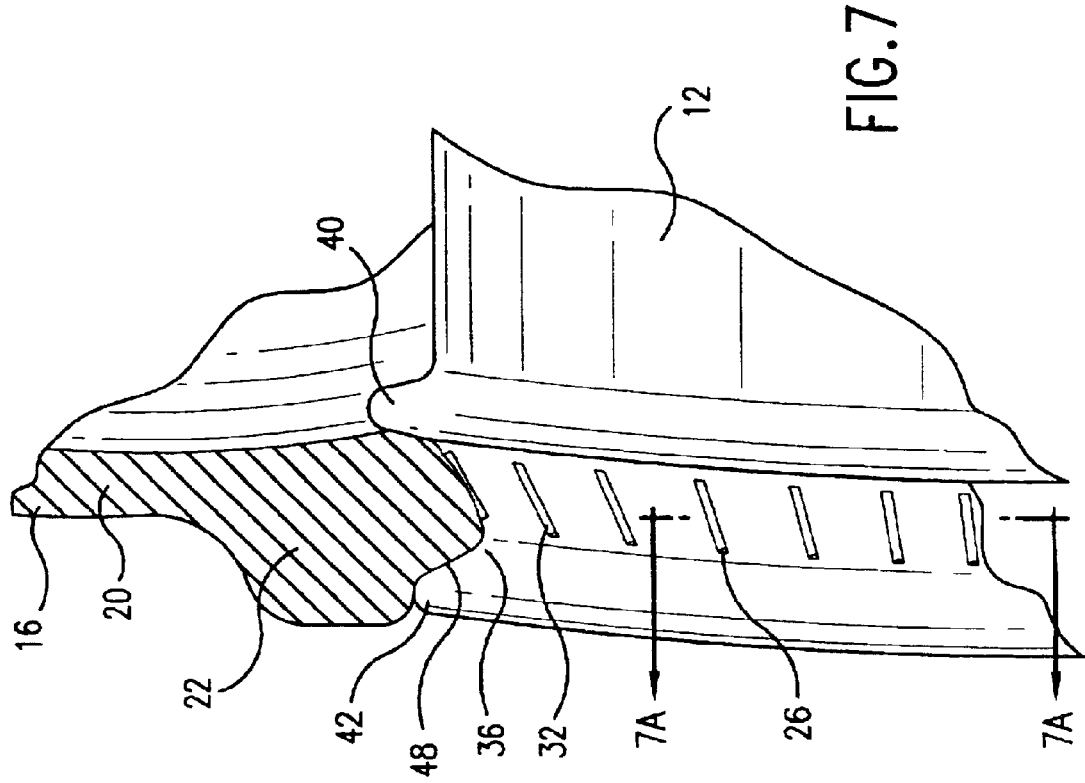

TIRE TO RIM ROTATION LIMITER FOR A RUN-FLAT ASSEMBLY

TECHNICAL FIELD

The present invention relates generally to rim and tire assemblies for pneumatic tubeless tires. More particularly, the present invention relates to a run-flat rim and tire assembly that has a friction member for preventing relative rotation between the rim and the tire.

BACKGROUND

During the twentieth century, tire designers and manufacturers have conceived of various designs with which to enable a pneumatic tubeless tire to continue to function even after a loss of air pressure. Generally, a tubeless fire is made of a tread section with two side walls. Beads are located at the end of each side wall and are typically rigid. The beads fit onto a rim. Putting air pressure into the interior of the tire causes the beads to seat against the rim and securely hold the tire onto the rim.

The design and use of a run-flat tire is desirable for several reasons. First, sudden loss of air pressure in a tire can result in a shifting of the position of the tire, and subsequently a change in the internal tensioning forces originally imparted by the tire on the rim to hold the tire thereon. The tire may become disengaged from the rim under certain circumstances.

Second, a loss of air pressure forces the tread of the tire down onto the rim. The rim must then assume the loading from the weight of the vehicle and the dynamic forces of the ride. As the rim is not designed for this purpose, damage to either the rim or even the wheel and axle supporting the rim can result. This in turn can lead to costly repairs in addition to leaving the driver and passenger stranded once the rim is too severely damaged to continue riding.

One such design of a run-flat tire is illustrated in U.S. Pat. No. 5,891,279 that is owned by the assignee of the present invention and is incorporated by reference herein in its entirety for all purposes. Tire and rim assemblies of this type have a flexible elastomeric material in the shape of a ring disposed on the rim. The tire surrounds this elastomeric ring. When the tire loses air pressure, the tire will deform and contact the elastomeric ring. The load of the vehicle and the dynamic load of the ride will then be born by the elastomeric ring. With reasonable and appropriate response by the driver of the vehicle, such design can improve vehicle control during a sudden loss of air pressure and can help protect the rim and other components. Run-flat tires are therefore desirable over conventional tires because with reasonable and appropriate action by the driver, such tires can help prevent accidents. Also, they allow drivers additional mileage by which to travel to a location where the tire can be inspected and repaired or replaced.

Sometimes during run-flat driving the elastomeric ring could possibly slip in relation to the tire which can result in the heating-up of the components and faster thermal degradation of the tire.

Increased weight on the axles of vehicles may be undesirable to automobile manufacturers because this weight reduces the handling abilities of the vehicle. It may therefore be desirable to decrease the weight of run-flat tire assemblies, and not to increase the weight of run-flat tire assemblies.

The present invention improves upon previous run-flat tires by preventing or reducing slippage between the tire and the rim during run-flat operation. As a result, the amount of heat and subsequent degradation of the tire and elastomeric ring during run-flat operation are reduced by the design of the present invention.

SUMMARY

Objects and advantages of the invention will be set forth in part in the following description, or may be obvious from the description, or may be learned from practice of the invention.

The present invention provides for a tire apparatus that is used for driving a vehicle during periods of low tire pressure and normal tire pressure. The tire apparatus includes a rim that has a first bead seat and a second bead seat. The rim has a cylindrical section that is between the first and second bead seats. The rim is configured for attachment to a wheel of the vehicle. A support ring is disposed on the cylindrical section of the rim. The support ring is configured for supporting the vehicle during periods of low tire pressure. Also, a tire is provided that has a tread portion and a pair of side walls that are adjacent to the tread portion. The tire has a first bead at one end of one of the side walls and a second bead at one end of the other of the side walls. The first bead is disposed in the first bead seat and the second bead is disposed in the second bead seat. At least one of the first and second bead seats has a plurality of friction members, that are disposed thereon, to prevent relative rotational movement between the tire and the rim. The first bead and the first bead seat form a first air seal zone, and the second bead and the second bead seat form a second air seal zone. The friction members are spaced from the first and second air seal zones.

Alternatively, the present invention may include an embodiment of a tire apparatus as previously discussed where the friction members are ridges on the surface of the bead seats. The ridges are oriented in a substantially axial direction.

Also, another embodiment of the present invention exists in a tire apparatus as discussed above where the friction members are depressions in the surface of the bead seats. The depressions are oriented in a substantially axial direction.

A further embodiment of the present invention exists in a tire apparatus as discussed above where the friction members are ridges on the surface of the bead seats with depressions in the surface of the bead seats located immediately adjacent thereto. Both the ridges and the depressions are oriented in a substantially axial direction.

The present invention also encompasses a tire apparatus as discussed above where the friction members are grit or roughness on the surface of the bead seats.

Another embodiment of the present invention may include a tire apparatus for driving a vehicle during periods of low tire pressure and normal tire pressure. The tire apparatus encompasses a tire that has a tread section where the tire has a pair of side walls located adjacent to the tread section. A first bead is located at one end of one of the side walls and a second bead is located at an end of the other side wall. A rim is also included that has a first bead seat and a second bead seat. The rim is configured for attachment to the wheel of a vehicle, and the rim has a support member for engaging the tire during periods of low tire pressure to allow the vehicle to be driven during periods of low tire pressure. At least one of the first and second bead seats has a plurality of friction members to prevent relative rotational movement between the tire and the rim.

Another embodiment of the present invention includes a tire apparatus as immediately discussed where the friction members are ridges on the surface of the bead seats. The ridges are oriented in a substantially axial direction.

Another embodiment of the present invention may include a tire apparatus as previously discussed where the friction members are depressions in the surface of the bead seats. The depressions are oriented in a substantially axial direction.

A still further embodiment of the present invention exists in a tire apparatus as previously discussed where the friction members are ridges on the surface of the bead seats along with depressions in the surface of the bead seats located immediately adjacent thereto. Both the ridges and the depressions are oriented in a substantially axial direction.

Alternatively, the present invention may include an embodiment of the tire apparatus as discussed above where the friction members are grit on the surface of the bead seats.

A still further embodiment of the present invention exists in a tire apparatus for driving a vehicle during periods of low tire pressure and normal tire pressure. The tire apparatus includes a rim that has a first bead seat and a second bead seat. The rim has a cylindrical section intermittent the first and second bead seats. The rim is configured for attachment to a wheel of the vehicle. A support ring is disposed on the cylindrical section of the rim. The support ring is configured for supporting the vehicle during periods of low tire pressure. Also, a tire is present that has a tread portion and a pair of side walls that are adjacent the tread portion. The tire has a first bead at one end of one of the side walls and a second bead at one end of the other of the side walls. The first bead is disposed in the first bead seat and the second bead is disposed in the second bead seat. At least one of the first and second bead seats has grit disposed thereon to prevent relative rotational movement between the tire and the rim. The first bead and the first bead seat form a first air seal zone, and the second bead and the second bead seat form a second air seal zone. The grit is spaced from the first and second air seal zones.

Yet another embodiment of the present invention exists in a tire apparatus for driving a vehicle during periods of low tire pressure and normal tire pressure. The tire apparatus has a tire with a tread section. The tire also has a pair of side walls located adjacent the tread section. A first bead is located at an end of one of the side walls, and a second bead is located at an end of another one of the side walls. At least one of the first and second beads has a plurality of friction members to prevent relative rotational movement between the tire and a rim. The rim has a first bead seat and a second bead seat. The rim is configured for attachment to the wheel of a vehicle. The rim has a support member for engaging the tire during periods of low tire pressure to allow the vehicle to be driven during these periods.

BRIEF DESCRIPTION OF THE DRAWINGS

FIG. 7 is a partial sectional view of a rim and a partial cross-sectional view of a tire engaging the rim in accordance with another embodiment of the present invention. The friction members shown are depressions in the surface of the rim.

FIG. 7A is a cross-sectional view taken along line 7A of FIG. 7. The view shows the cross-sectional profile of the depressions in the rim.

DETAILED DESCRIPTION

Figure 1:
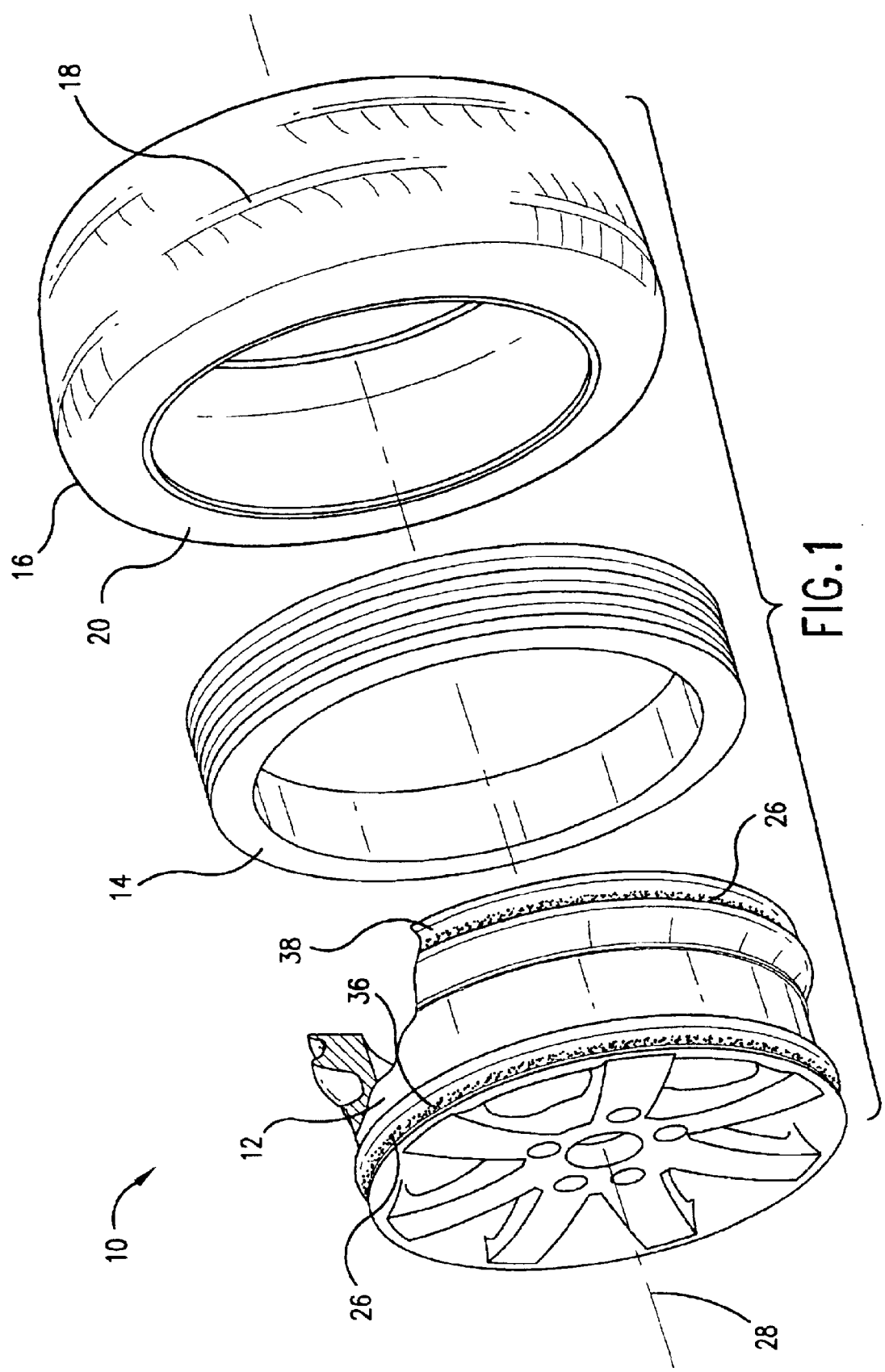
FIG. 1 is an exploded assembly view of an embodiment of a tire assembly of the present invention.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

Figure 2:
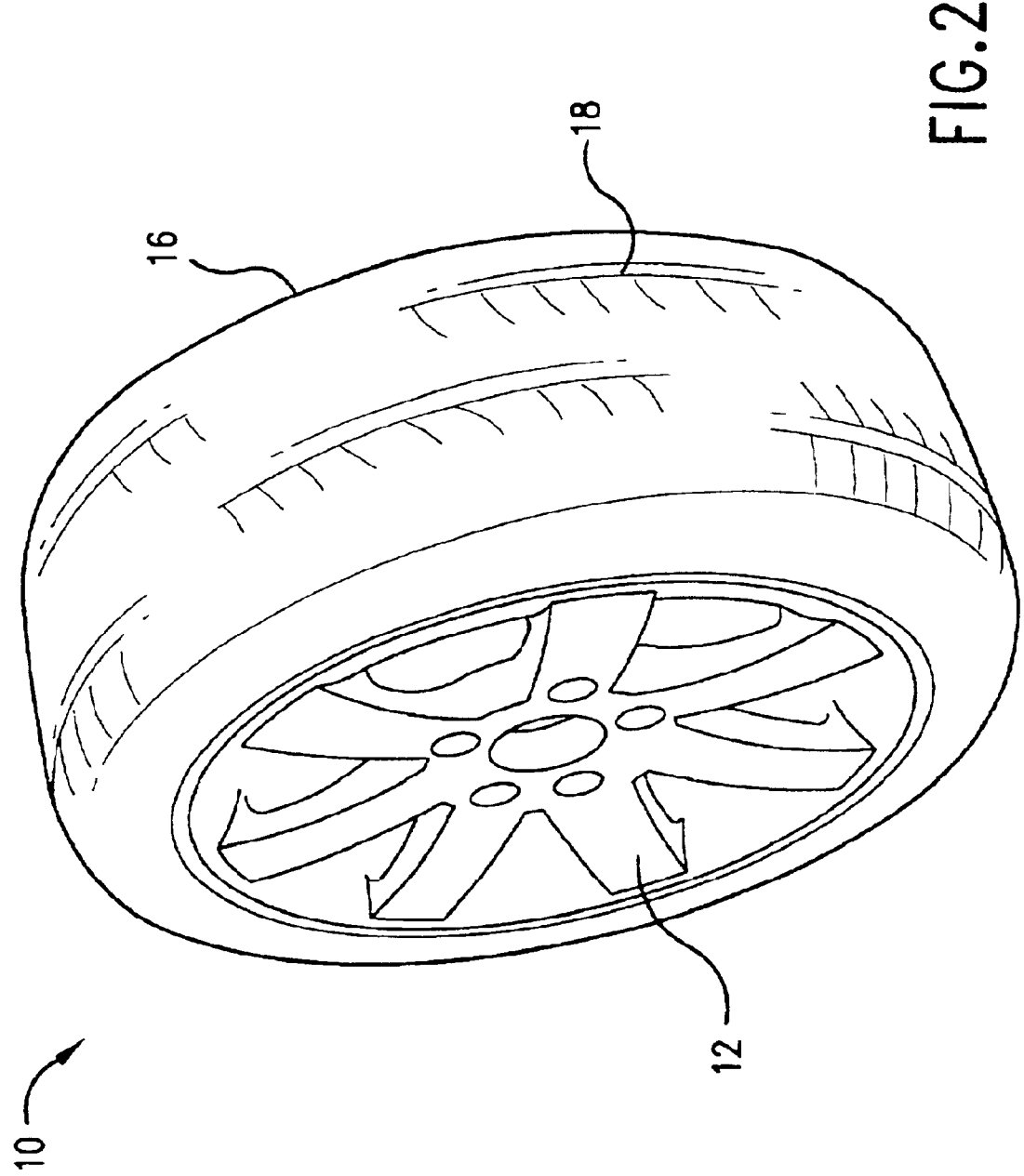
FIG. 2 is a perspective view of the tire assembly shown in FIG. 1.

Referring now to the drawings, a tire assembly 10 in accordance with an exemplary embodiment of the present invention is shown in FIG. 1. The tire assembly 10 is shown as being made of three basic components. First, an alloy or steel integral wheel rim 12 is provided onto which a support member 14 is placed. The support member 14 shown in FIG. 1 is a ring. Next, a rubber tire 16 is placed onto the rim 12 and completely surrounds the support member 14. The tire assembly 10 is shown in an assembled state in FIG. 2. The tire 16 is vertically anchored to the rim 12 as described in U.S. Pat. No. 5,634,993 that is assigned to the assignee of the present invention and incorporated herein for all purposes in its entirety.

The support member 14 is present in order to carry the static and dynamic loading the tire 16 is subjected to during the situation in which the tire 16 loses air pressure. The tire 16 will collapse down onto the support member 14, allowing for the support member 14 to assume the loading. The support member 14 is shown in FIG. 1 as being an elastomeric ring; however, other types of support members 14 may be envisioned and used in the present invention. For instance, the support member 14 may be configured as that shown in U.S. Pat. No. 5,891,279 that is assigned to the assignee of the present invention and incorporated herein for all purposes in its entirety. The present invention is not limited to any one particular type of support member 14.

A tire assembly 10 that uses a support member 14 may be referred to as a run-flat tire assembly 10. Such a tire assembly 10 allows a vehicle to be driven after a loss of air pressure for some distance while protecting the rim 12 or wheel from damage. However, other run-flat tire assemblies are known in the art that do not use a support member 14. One such run-flat tire assembly is disclosed in U.S. Pat. No. 5,868,190 that is assigned to the assignee of the present invention and is incorporated herein in its entirety for all purposes. The run-flat tire assembly disclosed in the '190 patent makes use of specially reinforced sidewalls to help prevent the tire from collapsing after the loss of air pressure.

The present invention improves upon run-flat tire assemblies 10 that incorporate a support member 14. In one exemplary embodiment, the improvement exists in providing a plurality of friction members 26 between the tire 16 and the rim 12. The friction members 26 inhibit relative rotational movement between the tire 16 and rim 12. Relative rotational movement between the tire 16 and rim 12 can exist whenever the tire assembly 10 is rotating. However, it is more common for this relative motion to occur during high torque applications such as when the vehicle is accelerating from a stopped position or during high speeds. In addition, during periods of low pressure (such as when there is a pressure loss inside of tire 16), the support member 14 engages tire 16. Relative movement or shifting between the tire 16 and rim 12 will create friction between the support member 14 and tire 16 because the support member 14 is rigidly attached to the rim 12. Friction between the support member 14 and tire 16 causes heat build up and wear on both the tire 16 and support member 14. Such friction may result in a loss of performance and life of these two parts under certain conditions. The use of friction members 26 helps prevent relative movement between the support member 14 and tire 16 and therefore can increase the life and performance of the tire assembly 10 during low pressure conditions.

Figure 3:
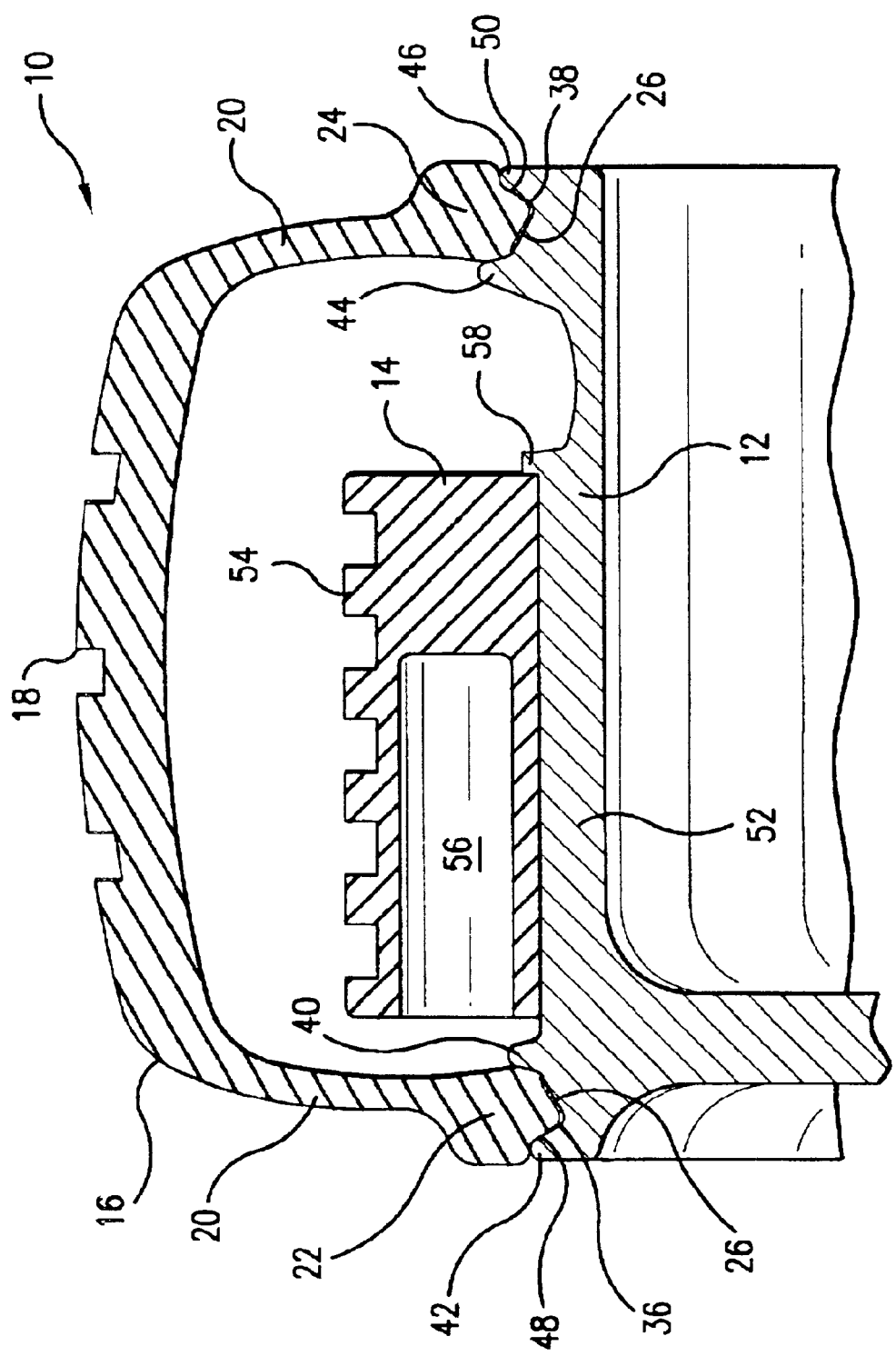
FIG. 3 is a partial cross-sectional view of another embodiment of a tire assembly in accordance with the present invention. The view shows a support member being housed on a rim within a tire.

FIG. 3 shows a partial cross sectional view of a tire assembly 10 in accordance with one exemplary embodiment of the present invention. Here, the support member 14 is similar to that disclosed in the '279 patent mentioned above, and is located on a cylindrical section 52 of the rim 12. The support member 14 may be grooved 54 or contoured on the outside surface. Additionally, a cavity 56 is located inside of the support member 14. The cavity 56 may extend the whole length of support member 14 or only around a portion of the circumference of support member 14. The cavity 56 is advantageous because it decreases the weight of the support member 14. A support member retaining flange 58 is present in order to help locate and secure the support member 14 on the cylindrical section 52 of rim 12.

Tire 16 is provided with tire tread 18 on its outer surface. The tire tread 18 used in the present invention may be of any variety, and the invention is not limited to a particular type. Two side walls 20 extend from the tire tread 18 portion of tire 16. As shown in this exemplary embodiment, the side walls 20 are substantially vertical in orientation once seated onto the rim 12. A first bead 22 is present at the end of one of the side walls 20, and a second bead 24 is present at the end of the other side wall 20. The use of beads helps to keep the tire 16 attached to the rim 12 and also to help create an air seal to maintain tire pressure.

Rim 12 has a first bead seat 36 and a second bead seat 38 formed therein for seating the first and second beads 22 and 24 respectively. The first bead seat 36 is formed by a pair of humps 40 and 42. The second bead seat 38 is formed by a pair of humps 44 and 46. It is to be understood, however, that the first bead seat 36 and the second bead seat 38 do not require the humps to be present in other embodiments of the present invention. The plurality of friction members 26 are disposed in the first and second bead seats 36 and 38.

A first air seal zone 48 is formed between the first bead 22 and the first bead seat 36. A second air seal zone 50 is formed between the second bead 24 and the second bead seat 38. These air seal zones 48 and 50 prevent air from escaping around the beads 22 and 24 respectively. The plurality of friction members 26 are spaced away from the air seal zones 48 and 50 to ensure no air is lost by their presence.

The exemplary tire assembly 10 shown in FIG. 3 has frictional members 26 located in both the first bead seat 36 and the second bead seat 38. However, the present invention also encompasses embodiments where the frictional members 26 may be placed on only one of the first bead seat 36 or second bead seat 38.

The embodiment shown in FIG. 3 also has the portion of rim 12 that has the second beat seat 38 being of a larger diameter than the portion of rim 12 that has the first bead seat 36. Additionally, the second bead 24 has a larger diameter than the first bead 22. The present invention is not limited to relative diameters between these components. For instance, the diameter of the first bead seat 36 may be larger than or equal to the diameter of the second bead seat 38. The same holds true for the diameter of the first bead 22 in relation to the second bead 24.

The embodiment shown in FIG. 3 is advantageous due to the fact that the first and second bead seats 36 and 38 each have a pair of humps associated therewith. This seating arrangement helps prevent relative axial motion or "squirm" during normal operations of the vehicle and hence increases the effectiveness of the frictional members 26 to prevent relative rotational motion between the tire 16 and rim 12. However, the present invention is not dependent upon the particular type of seating arrangement used, and other types of seating arrangements may be employed.

Figure 4:
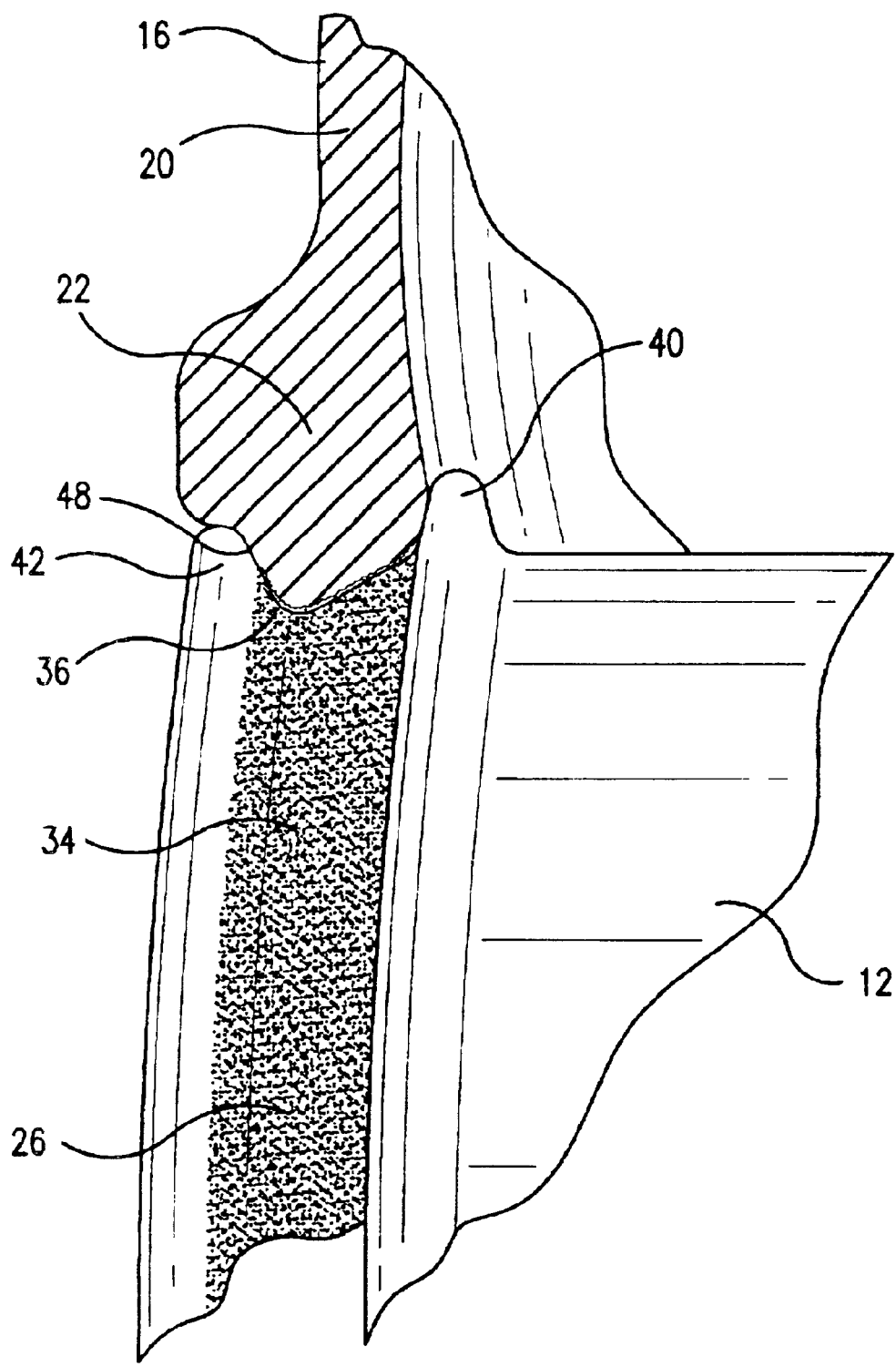
FIG. 4 is a partial sectional view of a rim and a partial cross-sectional view of a tire engaging the rim in accordance with one embodiment of the present invention. The friction members shown on the rim are grit or roughness.

FIG. 4 shows a close up view of another exemplary embodiment of the present invention. Here, the tire 16 is shown in partial cross section engaging a rim 12, only a section of which is shown. The plurality of friction members 26 are roughness or grit 34, and are located in the first bead seat 36. Grit 34 is spaced from the first air seal zone 48 in order to help ensure that no air escapes from the interior of tire 16. Grit 34 can be attached to the surface of the first bead seat 36 through adhesion, or may be formed integrally with the first bead seat 36. The amount of grit 34 may be adjusted depending upon the desired application of tire assembly 10 in order to provide an optimum amount of friction between the tire 16 and rim 12. Additionally, grit 34 need not be applied around the entire circumference of the first bead seat 36. The grit 34 may be applied to only a part of the circumference in other exemplary embodiments of the present invention.

Figure 5A:
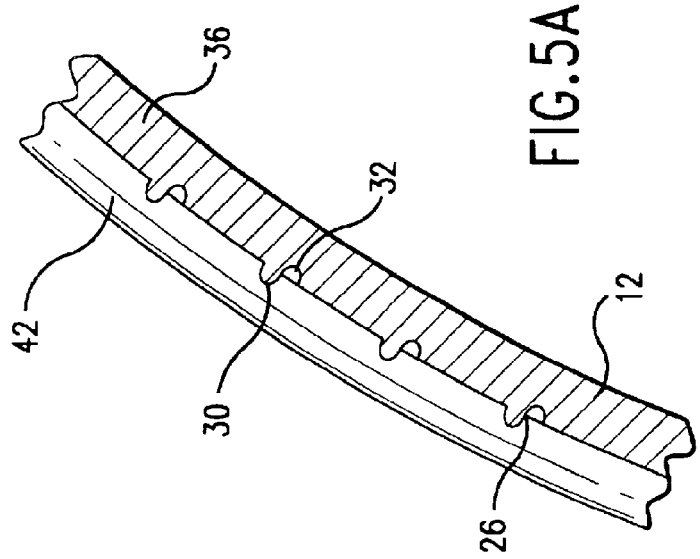
FIG. 5A is a cross-sectional view taken along line 5A of FIG. 5. The view shows the cross-sectional profile of the ridges and depressions on and in the rim.
Figure 5:
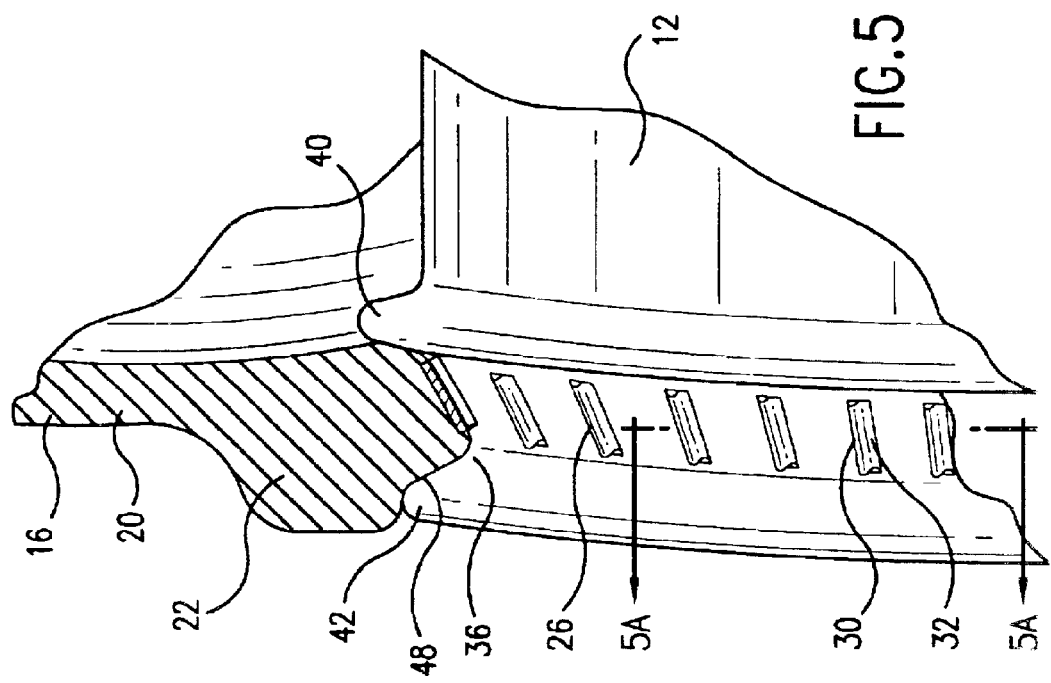
FIG. 5 is a partial section view of a rim and a partial cross-sectional view of a tire engaging the rim in accordance with another embodiment of the present invention. The friction members shown are a plurality of ridges having depressions located immediately adjacent thereto.

Another exemplary embodiment of the present invention is shown in FIG. 5. Here, the view is substantially similar to that shown in FIG. 4. However, the plurality of friction members 26 are not grit 34, but a series of ridges 30 and depressions 32 located on and in the surface of the first bead seat 36. Each of the ridges 30 has a depression 32 located immediately adjacent thereto. The ridges 30 and depressions 32 are located in a substantially axial direction. Here, the axial direction is defined as being parallel to the axis 28 of the rim 12 and tire 16 shown in FIG. 1. The ridges 30 and depressions 32 are curved and slightly angled however to account for the shape of rim 12.

The ridges 30 and depressions 32 act on the first bead 22 to create a frictional restraining force between the tire 16 and the rim 12 to prevent them from moving relative to one another. The ridges 30 are forced into the first bead 22, and the first bead 22 is pushed into the depressions 32. This interaction creates the frictional restraining force. FIG. 5A shows a cross section taken along line 5A of FIG. 5. Here, the ridges 30 and depressions 32 are shown as having a semi-circular cross section, although it is to be understood that the invention is not limited to semi-circular cross sections and that cross sections of other shapes may be used.

Figure 6A:
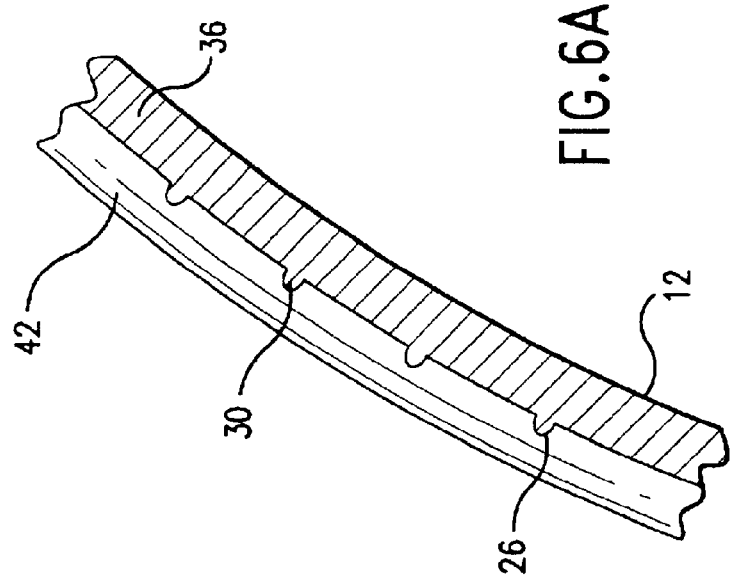
FIG. 6A is a cross-sectional view taken along line 6A of FIG. 6. The view shows the cross-sectional profile of the ridges in the rim.
Figure 6:
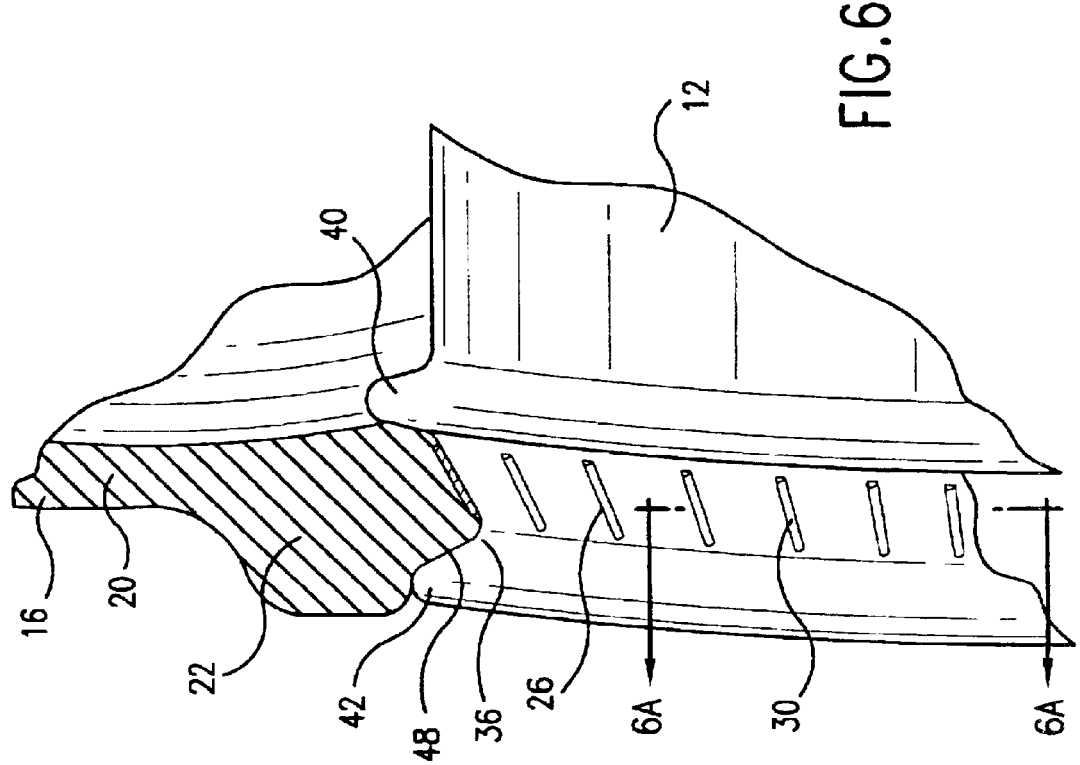
FIG. 6 is a partial sectional view of a rim and a partial cross-sectional view of a tire engaging the rim in accordance with another embodiment of the present invention. The friction members shown are a plurality of ridges on the rim.

FIG. 6 shows another exemplary embodiment of the present invention, the view being substantially similar to that shown in FIG. 5. Here however, the friction members 26 are a plurality of ridges 30, without the presence of the depressions 32 as shown in FIG. 5. The ridges 30 are aligned in the same substantially axial direction as discussed above with the friction members 26 of FIG. 5. Here, the ridges 30 are forced into the first bead 22 to create the frictional restraining force between the rim 12 and the tire 16. FIG. 6A is a cross sectional view taken along line 6A. FIG. 6A shows the cross section of the ridges 30 being semi-circular in shape. It is to be understood that the cross sectional shape of the ridges 30 are not limited to a semi-circular shape but may be any other variety.

FIG. 7 shows another embodiment of the present invention. The view of FIG. 7 is substantially similar to that shown in FIGS. 5 and 6. However, the friction members 26 are depressions 32 only in the surface of the bead seat 36. The depressions 32 are aligned in a substantially axial direction, that is in the same direction as the axis 28, as discussed above with the embodiments of FIGS. 5 and 6. The first bead 22 is forced into the depressions 32 in order to form the frictional restraining force imparted between the tire 16 and rim 12. FIG. 7A shows a cross sectional view along line 7A of FIG. 7. The depressions 32 are shown as being semi-circular in shape. Again, the depressions 32 may be of other cross sectional shapes in other embodiments of the present invention.

It is to be understood that the frictional members 26 shown in FIGS. 5–7 can be of any number in other embodiments of the present invention. The size, density, and shape of the friction members 26 may also be modified in other embodiments. Additionally, other embodiments of the present invention may have frictional members 26 that are not substantially axially aligned with the axis 28. Additionally, the friction members 26 may be located at the first bead seat 36 and/or the second bead seat 38. Applicants are only providing the aforementioned embodiments by way of example and not limitations of the present invention.

Figure 8:
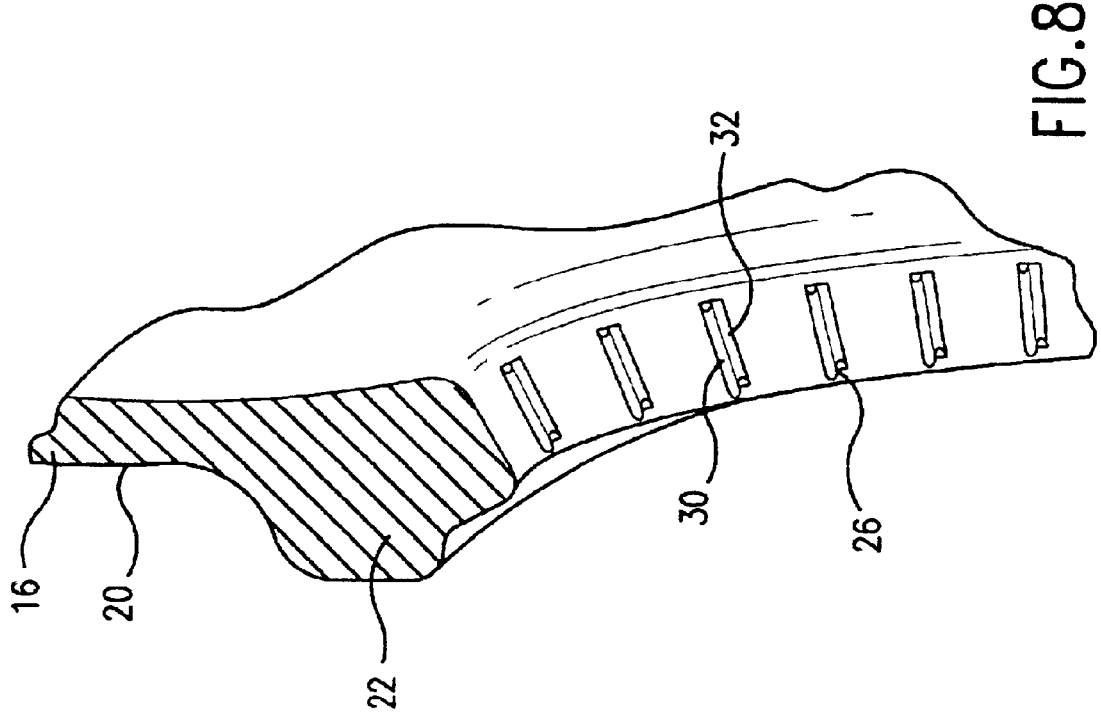
FIG. 8 is a partial section view of a tire in accordance with another embodiment of the present invention. The tire has a plurality of friction members being ridges located immediately adjacent to depressions in the surface of the bead of the tire.

FIG. 8 shows a still further exemplary embodiment of the present invention where the plurality of friction members 26 are located on a surface of the first bead 22 of the tire 16. The friction members 26 are a plurality of ridges 30 with depressions 32 located immediately adjacent thereto. The friction members 26 are therefore substantially similar to the friction members 26 shown in the embodiments in FIGS. 5 and 5A. However, in FIG. 8, the friction members 26 will most likely be made of the same type of material as that of the first bead 22, usually rubber. The friction members 26 on first bead 22 function in substantially the same way as in other embodiments. The friction members 26 impart a frictional restraining force on the rim 12, and prevent the rim 12 from moving relative to the tire 16 during operations of the vehicle.

Figure 9:
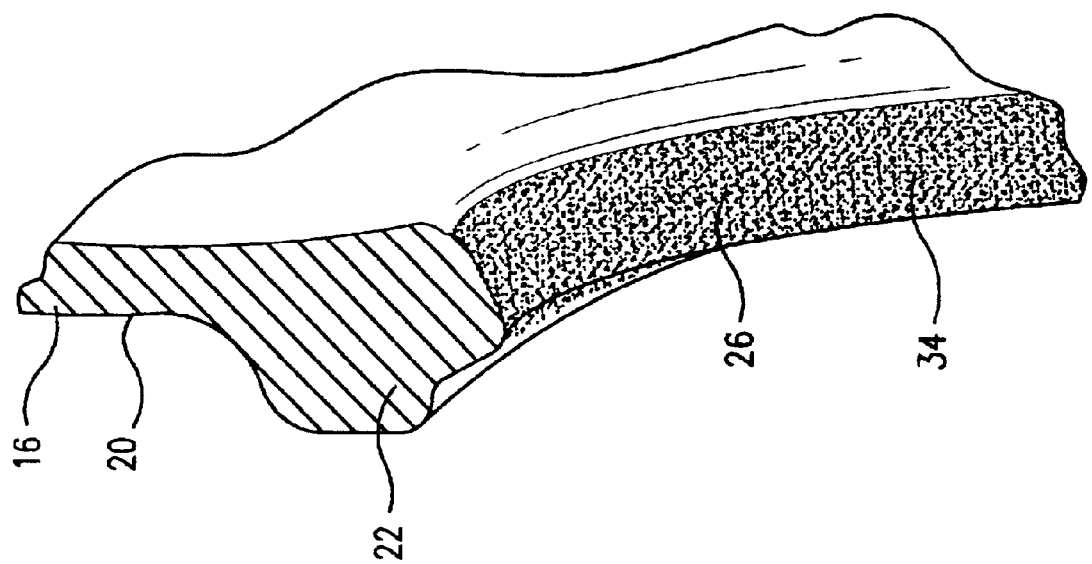
FIG. 9 is a partial section view of a tire in accordance with another embodiment of the present invention. The friction members shown on the bead of the tire are grit or roughness.

FIG. 9 shows yet another exemplary embodiment of the present invention. Here, the friction members 26 are roughness or grit 34 located on the surface of the first bead 22 of the tire 16. The grit 34 may be applied to the first bead 22 by adhesive, or may be formed integrally therewith. Additionally, the grit 34 may be of the same material as the first bead 22, or may be formed of a different material. The grit 34 acts to create a frictional restraining force between the tire 16 and the rim 12 during operation of the vehicle to prevent relative rotational motion between the two. The amount of grit 34 may be varied to produce varying degrees of frictional restraint.

The embodiments shown in FIGS. 8 and 9 are shown as friction members 26 that are located on the first bead 22. However, the present invention also encompasses embodiments where the friction members 26 are located on both the first bead 22 and the second bead 24, or even just the second bead 24. Additionally, the quantity and orientation of friction members 26 may be modified and the location of the friction members 26 on the beads 22 and 24 may be changed in other embodiments of the present invention. Also, the friction members 26 may or may not extend around the entire circumference of the beads 22 and 24.

It should be understood that the present invention includes various modifications that can be made to the embodiments of the tire apparatus described herein as come within the scope of the appended claims and their equivalents.

What is claimed is:

1. A tire apparatus for driving a vehicle during periods of low tire pressure and normal tire pressure, comprising:

a tire having a tread section, said tire also having a pair of side walls located adjacent said tread section, a first bead is located at an end of one of the side walls and a second bead is located at an end of the other side wall; and a rim having a first bead seat and a second bead seat, said rim is configured for attachment to a wheel of a vehicle, said rim having a support member for engaging said tire during periods of low tire pressure, at least one of said first and second bead seats having grit disposed thereon to prevent relative rotational movement between said tire and said rim, wherein said grit is disposed around the entire circumference of said at least one of said first and second bead seats.

2. The tire apparatus of claim 1, wherein at least one of said beads have a plurality of friction members on the surface of said beads to prevent relative rotational movement between said tire and said rim.

3. The tire apparatus of claim 1, wherein at least one of said first bead seats and said second bead seats is formed by a pair of humps in said rim.

4. The tire apparatus of claim 1, wherein said first bead and said second bead are of different diameters.

5. The tire apparatus of claim 4, wherein said first bead seat and said second bead seat are of different diameters.

6. A tire apparatus for driving a vehicle during periods of low tire pressure and normal tire pressure, comprising:

a rim having a first bead seat and a second bead seat, and said rim having a cylindrical section intermittent said first and second bead seats, said rim configured for attachment to a wheel of the vehicle;

a support ring disposed on said cylindrical section of said rim, said support ring configured for supporting the vehicle during periods of low tire pressure;

a tire having a tread portion and a pair of side walls adjacent said tread portion, said tire having a first bead at one end of one of said side walls and a second bead at one end of the other of said side walls, said first bead disposed in said first bead seat and said second bead disposed in said second bead seat, at least one of said first and second bead seats having grit disposed thereon to prevent relative rotational movement between said tire and said rim, said first bead and said first bead seat forming a first air seal zone and said second bead and said second bead seat forming a second air seal zone, said grit being spaced from at least one of said first and second air seal zones; and wherein said grit is disposed around the entire circumference of said at least one of said first and second bead seats.

7. The tire apparatus of claim 1, wherein at least one of said beads have a plurality of friction members on the surface of said beads to prevent relative rotational movement between said tire and said rim.

8. The tire apparatus of claim 1, wherein said first bead and said second bead are of different diameters.

9. The tire apparatus of claim 8, wherein said first bead seat and said second bead seat are of different diameters.

10. A tire apparatus for driving a vehicle during periods of low tire pressure and normal tire pressure, comprising:

a rim having a first bead seat and a second bead seat, and said rim having a cylindrical section intermittent said first and second bead seats, said rim configured for attachment to a wheel of the vehicle;

a support ring disposed on said cylindrical section of said rim, said support ring configured for supporting the vehicle during periods of low tire pressure; and a tire having a tread portion and a pair of side walls adjacent said tread portion, said tire having a first bead at one end of one of said side walls and a second bead at one end of the other of said side walls, said first bead disposed in said first bead seat and said second bead disposed in said second bead seat, at least one of said first and second bead seats having grit disposed around the entire circumference of said at least one of said first and second bead seats to prevent relative rotational movement between said tire and said rim, said first bead and said first bead seat forming a first air seal zone and said second bead and said second bead seat forming a second air seal zone, said grit being spaced from said first and second air seal zones, and the presence of said grit increases the amount of mass of said rim.

* * * * *

UNITED STATES PATENT AND TRADEMARK OFFICE
CERTIFICATE OF CORRECTION

PATENT NO. : 6,814,114 B2  
DATED : November 9, 2004  
INVENTOR(S) : Jean-Luc Bouvier, Jean-Claude Faure and Claude Eynard Page 1 of 1

It is certified that error appears in the above-identified patent and that said Letters Patent is hereby corrected as shown below:

<u>Title page,</u>  
Item [56], References Cited, FOREIGN PATENT DOCUMENTS, "DD L 20502 II/63d" should read -- DE 20502 II/63d --.

<u>Column 9,</u>  
Lines 15 and 19, "The tire apparatus of claim 1, wherein" should read -- The tire apparatus of claim 6, wherein --.

Signed and Sealed this

Thirteenth Day of September, 2005

JON W. DUDAS  
*Director of the United States Patent and Trademark Office*